US008129476B2

(12) United States Patent
Göbelt et al.

(10) Patent No.: US 8,129,476 B2
(45) Date of Patent: Mar. 6, 2012

(54) MODIFIED COMB COPOLYMERS

(75) Inventors: Bernd Göbelt, Wesel (DE); Jürgen Omeis, Dorsten-Lembeck (DE); René Nagelsdiek, Hamminkeln (DE); Sabine Johann, Oberhausen (DE)

(73) Assignee: BYK-Chemie GmbH, Wesel (DE)

( * ) Notice: Subject to any disclaimer, the term of this patent is extended or adjusted under 35 U.S.C. 154(b) by 339 days.

(21) Appl. No.: 12/521,261

(22) PCT Filed: Dec. 21, 2007

(86) PCT No.: PCT/EP2007/011329
§ 371 (c)(1),
(2), (4) Date: Jun. 25, 2009

(87) PCT Pub. No.: WO2008/080580
PCT Pub. Date: Jul. 10, 2008

(65) Prior Publication Data
US 2010/0022662 A1 Jan. 28, 2010

(30) Foreign Application Priority Data

Dec. 27, 2006 (DE) .................. 10 2006 062 441

(51) Int. Cl.
C08F 8/32 (2006.01)
C08F 8/40 (2006.01)
C08G 81/02 (2006.01)
C09D 17/00 (2006.01)
C09B 67/00 (2006.01)
(52) U.S. Cl. ............... 525/327.4; 525/331.7; 525/333.3
(58) Field of Classification Search ............... 525/327.4, 525/333.3, 331.7
See application file for complete search history.

(56) References Cited

U.S. PATENT DOCUMENTS

| 4,597,794 | A | 7/1986 | Ohta et al. |
| 4,647,647 | A | 3/1987 | Haubennestel et al. |
| 4,656,226 | A | 4/1987 | Hutchins et al. |
| 4,755,563 | A | 7/1988 | West |
| 4,762,752 | A | 8/1988 | Haubennestel et al. |
| 4,795,796 | A | 1/1989 | Haubennestel et al. |
| 4,871,667 | A | 10/1989 | Imada et al. |
| 5,085,698 | A | 2/1992 | Ma et al. |
| 5,160,372 | A | 11/1992 | Matrick |
| 5,177,151 | A * | 1/1993 | Yu .................. 525/213 |
| 5,219,945 | A | 6/1993 | Dicker et al. |
| 5,221,334 | A | 6/1993 | Ma et al. |
| 5,272,201 | A | 12/1993 | Ma et al. |
| 5,519,085 | A | 5/1996 | Ma et al. |
| 5,859,113 | A | 1/1999 | McIntyre et al. |
| 6,107,409 | A | 8/2000 | Hogan et al. |
| 6,291,620 | B1 | 9/2001 | Moad et al. |
| 6,306,994 | B1 | 10/2001 | Donald et al. |
| 6,316,564 | B1 | 11/2001 | Huybrechts et al. |
| 6,406,143 | B1 | 6/2002 | Chen et al. |
| 6,413,306 | B1 | 7/2002 | Kraiter et al. |
| 6,423,785 | B1 | 7/2002 | Esselborn et al. |
| 6,472,463 | B1 | 10/2002 | Ma |
| 6,528,593 | B1 | 3/2003 | Eiffler et al. |
| 6,849,679 | B2 | 2/2005 | Auschra et al. |
| 7,078,464 | B2 | 7/2006 | Schmidhauser et al. |
| 2007/0037934 | A1* | 2/2007 | Kluglein et al. ........... 525/333.3 |
| 2010/0099813 | A1* | 4/2010 | Gobelt et al. .................. 524/549 |

FOREIGN PATENT DOCUMENTS

| CN | 1 420 135 A | 5/2003 |
| DE | 35 27 038 A1 | 1/1987 |
| DE | 41 42 388 A1 | 7/1992 |
| DE | 199 49 593 A1 | 4/2001 |
| DE | 103 43 904 A1 | 4/2005 |
| DE | 697 29 995 T2 | 7/2005 |
| DE | 600 16 758 T2 | 12/2005 |
| EP | 0 438 836 A1 | 7/1991 |
| EP | 1 026 178 A1 | 8/2000 |
| EP | 1 142 972 A2 | 10/2001 |
| EP | 1 416 019 A1 | 5/2004 |
| EP | 1 587 848 B1 | 10/2005 |
| JP | 60 123 514 A | 7/1985 |
| JP | 04 103 692 A | 4/1992 |
| WO | 98/01478 A1 | 1/1998 |
| WO | 98/58974 A1 | 12/1998 |
| WO | 99/31144 A1 | 6/1999 |
| WO | 01/44389 A1 | 6/2001 |
| WO | 02/051948 A2 | 7/2002 |
| WO | 03/046029 A1 | 6/2003 |
| WO | 2007/039603 A2 | 4/2007 |

OTHER PUBLICATIONS

Buxbaum et al., "Industrial Inorganic Pigments", Wiley-VCH Verlag GmbH & Co KGaA, 3rd Edition, (2005).
Hawker et al., "New Polymer Synthesis by Nitrixide Mediated Living Radical Polymerizations", Chen. Rev. vol. 101, No. 12, pp. 3661-3688, (2001).
Herbst et al., "Industrielle Organische Pigmente" VCH Verlagsgesellschaft mbH, (1987).

(Continued)

Primary Examiner — Nathan M Nutter
(74) Attorney, Agent, or Firm — Norris McLaughlin & Marcus PA

(57) ABSTRACT

The present invention relates to modified comb copolymers comprising special structural units, which are produced by converting SMA resins and optionally special copolymers with an AB block copolymer structure with a mixture of at least one polyalkylene oxide monoamine and at least one amino alcohol, with a mixture of at least one polyalkylene oxide monoamine and at least one N,N-disubstituted diamine or a mixture of at least one polyalkylene oxide monoamine, at least one N,N-disubstituted diamine and at least one polymer selected from the group comprising monohydroxy-terminated polyalkylene oxides, monohydroxy-terminated polyesters and monohydroxy-terminated block copolymers comprising polyalkylene oxide and polyester blocks, and their monohydroxy-terminated side chains are converted to phosphoric acid ester groups or their N,N-disubstituted amino-terminated side chains are converted to quaternary ammonium salts, and their use as wetting and dispersing agents.

23 Claims, No Drawings

OTHER PUBLICATIONS

Moad et al., "Living Radical Polymerization by the RAFT Process", Aust. J. Chem. vol. 58, p. 379-410, (2005).

Moad et at., "Living Free Radial Polymerization with Reversible Addition—Fragmentation Chain Transfer (the Life of RAFT)", Society of Chemical Industry, Polym Int., vol. 49, p. 993-1001, (2000).

Perrier et al., "Macromolecular Design via Reversible Addition—Fragmentation Chain Transfer (RAFT)/Xanthates (MADIX) Polymerization", Journal of Polymer Science, vol. 43, pp. 5347-5393, (2005).

Tseng et al., "Compatibilization of PS and PA6 Blends by Means of Poly(ixyalkylene)amine Modified Styrene-Maleic Anhydride Copolymer", Journal of Polymer Reseach, vol. 12 p. 439-447, (2005).

* cited by examiner

MODIFIED COMB COPOLYMERS

This is a 371 of PCT/EP2007/011329 filed 21 Dec. 2007 (international filing date).

The present invention relates to modified comb copolymers comprising special structural units as stated in the claims, their production by converting SMA resins and optionally special copolymerisates with a mixture of at least one polyalkylene oxide monoamine and at least one amino alcohol, with a mixture of at least one polyalkylene oxide monoamine and at least one N,N-disubstituted diamine or a mixture of at least one polyalkylene oxide monoamine, at least one N,N-disubstituted diamine and at least one polymer selected from the group comprising monohydroxy-terminated polyalkylene oxides, monohydroxy-terminated polyesters and monohydroxy-terminated block copolymers comprising polyalkylene oxide and polyester blocks, and their subsequent at least partial conversion of the monohydroxy-terminated side chains to phosphoric acid ester groups or the N,N-disubstituted amino-terminated side chains are converted to quaternary ammonium salts, and their use as wetting and dispersing agents.

It is known that a plurality of comb copolymers can be used as wetting and dispersing agents that can, however, only be used with the desired effect either in an aqueous system or in an organic solvent system in accordance with their structure.

BACKGROUND OF THE INVENTION

Therefore, comb copolymers are already known from the prior art, in which the solubility properties can be adjusted by selection of the co-monomers in the side chains so that solubility is either provided in an aqueous system or in an organic solvent system. Thus, comb copolymers, in which the side chains are composed of polyacrylates or polyesters and are modified with phosphoric acid ester groups, amine groups, salts of amines or quaternary ammonium salts as end groups, and whose solubility either in water or in an organic solvent can be adjusted by selection of the co-monomers in the side chains, are described in U.S. Pat. No. 6,472,463 or DE-C-60 016 758. However, a solubility both in an aqueous medium and in an organic solvent cannot be adequately adjusted herewith, and therefore the use of such comb copolymers as wetting and dispersing agents, e.g. in colour filter production processes, can only lead to excessively long processing times.

Comb copolymers based on styrene/maleic anhydride resins (SMA resins), which have polyether side chains but no adhesion groups, are described in U.S. Pat. No. 6,406,143 or in U.S. Pat. No. 6,528,593. These dispersing agents have the disadvantage that they cannot adequately stabilise organic pigments in formulations containing solvent.

The use of comb copolymers based on SMA resins disclosed in U.S. Pat. No. 6,423,785 that have polyether side chains and can be modified with amine oxide groups as wetting and dispersing agents does not always meet the requirements for a dispersion of pigments that is stable in storage.

This also applies to the use of comb copolymers based on SMA resins that can have polyether side chains and amino groups, which are converted to salts with unsaturated carboxylic acids (cf. U.S. Pat. No. 7,078,464), since the described adhesion groups do not represent adhesion groups that are suitable for all application areas. An additional consideration with the use as wetting and dispersing agents is that as a result of salification with an unsaturated carboxylic acid there is the risk of polymerisation and thus an undesirable salification of the wetting or dispersing agent during storage.

Therefore, on the basis of the prior art there was a need to make wetting and dispersing agents available that besides an excellent stabilisation of solid dispersions, in particular pigment dispersions, have an excellent solubility both in aqueous media and in organic media in order to meet the increased requirements for wetting and dispersing agents in many fields of application such as universal tinting pastes, pigment surface modification for the production of easy to process pigments or colour resists for colour filters. In particular, in the case of these requirements a very low viscosity of the pigmented paint is also required, which can generally only be achieved with a wetting and dispersing agent with an extremely good stabilisation of the pigment dispersion also during storage.

Therefore, it was an object of the present invention to provide comb copolymers, which are highly soluble in aqueous media as well as in organic media and with which solid dispersions that are low-viscosity and stable in storage are obtained as wetting and dispersing agents.

SUMMARY OF THE INVENTION

This object is achieved by the provision of the comb copolymers according to the invention based on at least one copolymerisate comprising optionally substituted styrene and maleic anhydride units that have the combinations of the following structural units I to X indicated below:

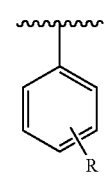

I

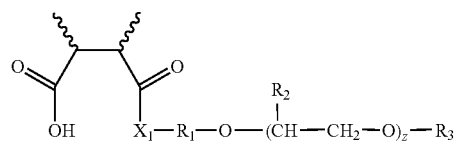

II

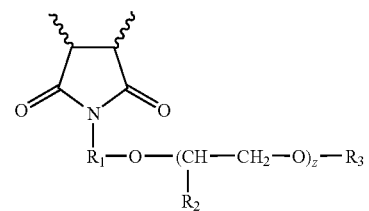

III

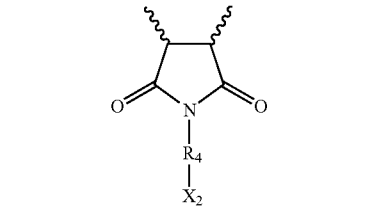

IV

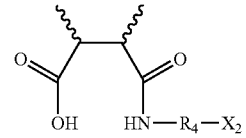

V

VI

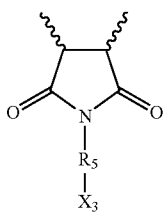

VII

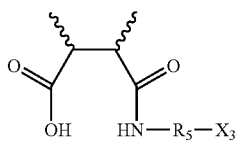

VIII

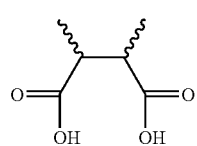

IX

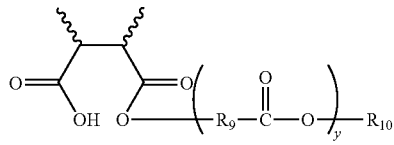

X

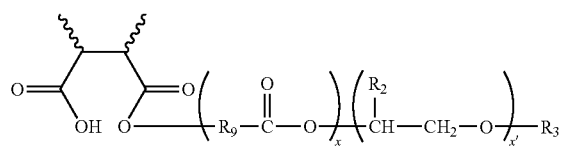

wherein

⁓⁓⁓ stands for the chain linkage,

R stands for H, halogen, preferably chlorine, a nitro group, an alkyl group with 1 to 15 C atoms or an aryl group with 6 to 18 C atoms, $R_1$ stands for an alkylene group with 1 to 24 C atoms or a substituted or unsubstituted arylene group with 6 to 18 C atoms, $R_2$ stands for H or an alkyl group, preferably for H or $CH_3$, wherein 0 to 95%, preferably 30 to 70% of $R_2$ represent an alkyl group, preferably a methyl group, z stands for a whole number from 3 to 70, $X_1$ stands for NH and/or O, $R_3$ stands for an optionally substituted, optionally mono- or polyunsaturated alkyl group with 1 to 30 C atoms, an optionally substituted aryl group with 6 to 18 C atoms, an optionally substituted cycloalkyl group with 4 to 10 C atoms, $R_4$ and $R_5$, the same or different, stand for an optionally substituted alkylene group with 1 to 15 C atoms, an optionally substituted cycloalkylene group with 4 to 10 C atoms or a substituted or unsubstituted arylene group with 6 to 18 C atoms, $X_2$ stands for a phosphoric acid ester group or a hydroxyl group, wherein 0 to 75% of $X_2$ can stand for a hydroxyl group, $X_3$ stands for an N,N-disubstituted amino group of the general formula A,

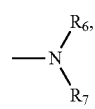   A or a quaternary ammonium group of the general formula B,

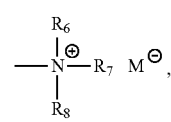   B wherein

Me stands for a carboxylic acid residue that is not ethylene unsaturated, a sulphate residue or a halide, preferably a chloride, bromide or iodide, $R_6, R_7, R_8$, the same or different, stand for an alkyl group with 1 to 15 C atoms, a cycloalkyl group with 6 to 10 C atoms or a substituted or unsubstituted aryl group with 6 to 18 C atoms, preferably for a methyl, ethyl and/or benzyl group, wherein 0 to 75% of $X_3$ can stand for an N,N-disubstituted amino group of the general formula A, and $R_9$ stands for an optionally substituted alkylene residue with 2 to 15 C atoms, a optionally substituted cycloalkylene residue with 6 to 10 C atoms and/or for a optionally substituted arylene residue with 6 to 18 C atoms, $R_{10}$ stands for an optionally substituted alkyl residue with 1 to 30 C atoms, which can optionally be mono- or polyunsaturated, and/or an optionally substituted aryl residue, x stands for a whole number from 1 to 70 x' stands for a whole number from 3 to 70 y stands for a whole number from 1 to 70, wherein the comb copolymer has either a 1. combination of structural units I to V and VIII, wherein $X_1$ in structural unit II only stands for an NH group, a
2. combination of structural units I to III and VI to VIII, or a
3. combination of structural units I to III and VI to VIII and structural unit IX and/or X, and is optionally present in mixture with at least one further comb copolymer based on an AB block copolymer structure comprising an A block, which is formed from optionally substituted styrene and maleic anhydride, and a B block, which is formed from optionally substituted styrene and/or (meth) acrylate monomers, and its maleic anhydride groups are present to at least 70% as structural units in one of the following combinations:

a 4. combination of structural units II to V and VIII, wherein $X_1$ in structural unit II only stands for an NH group, a
5. combination of structural units II to III and VI to VIII or a 6. combination of structural units II to III and VI to VIII and structural unit IX and/or X.

The mixture composed of comb copolymers according to the invention and comb copolymers based on an AB block copolymer structure indicated above is referred to hereafter as comb copolymer mixture.

DETAILED DESCRIPTION

In the indicated combinations of the structural units the comb copolymers according to the invention or comb copolymer mixture preferably have structural units, in which R is H
$R_1$ is an alkylene group with 1 to 6 C atoms,
$R_2$ is H or $CH_3$,
wherein the molar ratio of ethylene oxide units to propylene oxide units in structural unit II and structural unit III lies in the range of 30:70 to 70:30,
$X_2$ to at least 50% is a phosphoric acid ester group,
$R_3$ is an alkyl group with 1 to 8 C atoms or an optionally substituted aryl group with 6 C atoms,
$R_4$ is an alkylene group with 1 to 8 C atoms,
$R_5$ is an alkylene group with 1 to 8 C atoms,
$X_3$ is present to 100% as a residue of the general formula B,
$R_6$, $R_7$, $R_8$, the same or different, are an optionally substituted alkyl group with 1 to 8 C atoms, preferably a methyl, ethyl or benzyl residue,
$R_9$ is an optionally substituted alkylene group with 3 to 8 C atoms,
$R_{10}$ is an optionally substituted alkylene residue with 4 to 20 C atoms,
z is a whole number from 5 to 60,
y is a whole number from 2 to 60,
x is a whole number from 2 to 60,
x' is a whole number from 5 to 60,
wherein the molar ratio of structural units II, III and IX and/or X to structural units VI and VII amounts to 25:75 to 75:25.

It is especially preferred if the indicated structural units I to X have the following structure:
R=H,
$R_1$ is an ethylene, propylene and/or isopropylene residue,
$R_2$ is H or a $CH_3$ residue,
wherein the molar ratio of ethylene oxide units to propylene oxide units amounts to 70:30 to 30:70,
$R_3$ is a $CH_3$ or $C_4H_9$ residue,
z is a whole number from 25 to 50,
$X_1$ is NH and/or O,
$R_4$, $R_5$ the same or different, are an alkyl residue with 2-4 C atoms,
$R_6$, $R_7$, $R_8$, the same or different, are a $CH_3$, $C_2H_5$ or benzyl residue, with $M^\ominus$ chloride or bromide,
$R_9$ is an alkylene residue with 4 and/or 5 C atoms,
$R_{10}$ is an alkyl residue with 4-20 C atoms,
x is a whole number from 4 to 30,
x' is a whole number from 25 to 50 and
y is a whole number from 4 to 30.

The comb copolymers or comb copolymer mixtures according to the invention are obtainable a) by conversion of at least one optionally substituted styrene/maleic anhydride copolymerisate (SMA resin) optionally in mixture with at least one further copolymer based on an AB block copolymer structure consisting of at least one A block, which is formed from optionally substituted styrene and maleic anhydride, and a B block, which is formed from optionally substituted styrene and/or (meth)acrylate monomers,
with
a1) a mixture of at least one polyalkylene oxide monoamine having a primary amino end group and at least one amino alcohol
or
a2) a mixture of at least one polyalkylene oxide monoamine having a primary amino group and at least one N,N-disubstituted diamine
or
a3) a mixture comprising a2) and at least one polymer selected from the group comprising monohydroxy-terminated polyalkylene oxides, monohydroxy-terminated polyesters and monohydroxy-terminated polyester-polyalkylene oxide block copolymers,
and
b) a subsequent at least partial conversion
b1) of the free hydroxyl groups of the comb copolymer obtained according to a1) or the comb copolymer mixture to phosphoric acid ester groups
or
b2) of the free N,N-disubstituted amino groups of the comb copolymer obtained according to a2) or a3) or the comb copolymer mixture with at least one alkylation compound to quaternary ammonium groups.

The SMA resins used as base polymers in the conversion are styrene-maleic anhydride copolymerisates, wherein the styrene can optionally be substituted with alkyl groups with 1 to 15 C atoms such as methyl, with aryl groups with 6 to 18 C atoms, halogen, preferably chlorine, or at least one nitro group. The molar ratio of the optionally substituted styrene to maleic anhydride units preferably lies at 1:1 to 8:1. A molar ratio of 1:1 to 2:1 is particularly preferred to obtain a high density of side chains and adhesion groups. The number average molecular weight of the SMA resins used preferably lies between 1000 g/mol and 20 000 g/mol (determined using GPC).

According to the invention the "S" of the term SMA resin is understood to stand for both a substituted and an unsubstituted styrene. SMA resins can have a statistical, alternating, gradient-type or block-type structure. They can be produced by radically initiated polymerisation processes, e.g. by means of azo- or peroxide initiators. In order to set a desired molecular weight, chain transfer agents such as e.g. thiols, secondary alcohols or alkyl halides such as carbon tetrachloride can be added during polymerisation. Controlled radical polymerisation processes that are suitable for the production of SMA resins are described in the following publications, the corresponding disclosure of which is incorporated herewith as part of the disclosure of the present application:
the reversible addition fragmentation chain transfer process (RAFT), which when specific chain transfer agents are used is also called MADIX and addition fragmentation chain transfer, and is only referred to according to the invention as RAFT, and e.g. in Polym. Int. 2000, 49, 993; Aust. J. Chem. 2005, 58, 379; J. Polym. Sci. Part A: Polym. Chem. 2005, 43, 5347; U.S. Pat. No. 6,291,620, WO 98/01478, WO 98/58974 and WO 99131144, or
controlled polymerisation with nitroxyl compounds as chain transfer agents (NMP) is disclosed, for example, in Chem. Rev. 2001, 101, 3661. The advantageous use of aromatic co-monomers such as styrene additionally for the production of wetting and dispersing agents based on polymers containing anhydride has already been described in U.S. Pat. No. 4,597,794.

$C_1$-$C_4$ alcohol initiated polyethers, which are formed from ethylene oxide and propylene oxide units and bear a primary amino group as end group, are preferably used as polyalkylene oxide monoamines for the production of the comb polymers according to the invention or the comb copolymer mixtures. The weight ratio of ethylene oxide to propylene oxide units should preferably lie between 5:95 and 100:0, particularly preferred between 30:70 and 70:30. The number average molecular weight of the polyalkylene oxide monoamines preferably lies between 500 g/mol and 3000 g/mol (determined via amine value or $^1$H-NMR spectroscopy).

Monohydroxy-terminated polyethers, monohydroxy-terminated polyesters and/or monohydroxy-terminated polyether-polyester block copolymers can be used, if necessary, in addition to the polyalkylene oxide monoamines from 0% mol. to 80% mol. in relation to the polyalkylene oxide monoamines.

The weight ratio of ethylene oxide to propylene oxide units of the monohydroxy-terminated polyether component preferably lies between 0:100 and 100:0, particularly preferred between 30:70 and 70:30. The number average molecular weight preferably lies between 200 g/mol and 3000 g/mol (measured by $^1$H-NMR spectroscopy).

The monohydroxy-terminated polyesters and monohydroxy-terminated polyether-polyester block copolymers are those that can be obtained by polymerisation of one or more, optionally alkyl-substituted, hydroxy carboxylic acids and/or lactones thereof such as, for example, propiolactone, valerolactone, caprolactone, by means of a monohydroxy starting component, as described in EP-A-154 678 (U.S. Pat. No. 4,647,647). These preferably have a number average molecular weight Mn of 150 to 5000 g/mol (determined by the OH number or $^1$H-NMR spectroscopy). The monofunctional alcohols used as starting components preferably have 1 to 30, particularly preferred 4 to 14, carbon atoms. By way of example, n-butanol, longer-chain saturated and unsaturated alcohols such as propargyl alcohol, oleyl alcohol, linoleyl alcohol, oxo alcohols, cyclohexanol, phenyl ethanol, neopentyl alcohol, and also fluorinated alcohols can be given. Alcohols of the above-described type or substituted and unsubstituted phenols can also be converted with ethylene oxide and/or propylene oxide into polyoxyalkylene monoalkyl, polyoxyalkylene monoaryl, polyoxyalkylene aralkyl and polyoxyalkylene monocycloalkyl ethers by alkoxylation using known methods, and these hydroxy polyethers can be used as starting components for the lactone polymerisation. Mixtures of aforementioned compounds can also be used in each case. Lactone polymerisation is initiated in a known manner with e.g. p-toluol sulphonic acid or dibutyl tin dilaurate and conducted at temperatures from about 70° C. to 180° C. ε-caprolactone-based polyesters, possibly in combination with δ-valerolactone, are particularly preferred.

Aliphatic, cycloaliphatic or aromatic hydrocarbon compounds that have a primary amino function and have a hydroxyl group are preferably used as amino alcohols. Amino alcohols with a possibly substituted alkylene group with 1 to 15 C atoms with a possibly substituted cycloalkylene group with 4 to 10 C atoms or a possibly substituted arylene group with 6 to 18 C atoms are preferably used. The use of short-chain aliphatic amino alcohols such as 2-amino ethanol and 3-amino propanol is particularly preferred.

Where the free hydroxyl functions of the comb copolymer are converted to phosphoric acid esters, the usual phosphorylation agents such as polyphosphoric acid or phosphoryl chloride are used.

The N,N-disubstituted diamines to be used preferably have the general structure

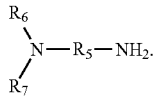

in which $R_5$ stands for an aliphatic, cycloaliphatic or aromatic hydrocarbon residue, preferably for an optionally substituted alkylene group with 1 to 15 C atoms, an optionally substituted cycloalkylene group with 4 to 10 C atoms or a substituted or unsubstituted arylene group with 6 to 18 C atoms, particularly preferred for a methylene, ethylene, propylene, butylene, hexylene, cyclohexylene, benzylene or phenylene residue, most particularly preferred for an ethylene, propylene and/or butylene residue.

The amino substituents $R_6$ and $R_7$, the same or different, can stand for an aliphatic, cycloaliphatic or aromatic hydrocarbon residue, preferably for an alkyl group with 1 to 15 C atoms, a cycloalkyl group with 6 to 10 C atoms or a substituted or unsubstituted aryl group with 6 to 18 C atoms, particularly preferred for a methyl, ethyl, propyl, 2-ethylhexyl, cyclohexyl, benzyl or phenyl residue, most particularly preferred for a methyl or ethyl residue. Therefore, the use of N,N-dialkylaminoalkyl amines such as N,N-dimethylaminoethylamine, N,N-dimethylaminopropylamine, N,N-diethylaminoethylamine and/or N,N-diethylaminopropylamine as N,N-disubstituted diamines is most particularly preferred. If the N,N-disubstituted amino groups of the comb copolymers of the general formula A are converted with an alkylation agent to quaternary ammonium groups of the general formula B, then $R_8$, the same as or different from $R_6$ or $R_7$, has the meaning that was specified above for residues $R_6$ and $R_7$. The conversion to quaternary ammonium groups of the general formula B can be conducted by means of alkylation agents using known methods, wherein alkyl halides such as $C_1$-$C_{15}$ alkyl chlorides, bromides or iodides, particularly preferred methyl iodide, ethyl iodide, ethyl bromide and/or benzyl chloride, are preferably used as alkylation agents. The quaternisation can also be conducted using oxirans and saturated carboxylic acids.

In addition, the SMA resins can be used in mixture with at least one further copolymer based on an AB block copolymer structure that is formed by a block A comprising a copolymer of optionally substituted styrene and maleic anhydride units and a block B comprising a (co)polymer of optionally substituted styrene and/or at least one (meth)acrylate monomer.

Examples of (meth)acrylates are aryl or alkyl acrylates or methacrylates such as alkyl (meth)acrylates of straight-chained, branched or cycloaliphatic alcohols with 1 to 22 carbon atoms such as, for example, methyl (meth)acrylate, ethyl (meth)acrylate, n-butyl (meth)acrylate, i-butyl (meth)acrylate, t-butyl (meth)acrylate, lauryl (meth)acrylate, 2-ethylhexyl (meth)acrylate, stearyl (meth)acrylate, cyclohexyl (meth)acrylate, isobornyl (meth)acrylate, arylalkyl (meth) acrylates such as benzyl methacrylate, or phenyl acrylates, wherein the aryl residues can respectively be unsubstituted or up to 4-substituted such as, for example, 4-nitrophenyl methacrylate; (meth)acrylates of halogenated alcohols such as, for example, perfluoroalkyl (meth)acrylates with 6 to 20 carbon atoms. These copolymerisates based on AB block copolymer structures can be obtained by RAFT or NMP polymerisation, as described above.

The weight ratio of the A to the B blocks preferably lies in the range of 95:5 to 5:95, particularly preferred from 90:10 to 10:90.

The comb copolymers according to the invention or comb copolymer mixtures are preferably obtainable by at least one SMA resin and optionally at least one above-described further copolymer being firstly dissolved in a suitable solvent. For this, a mixture of at least one polyalkylene oxide monoamine and at least one amino alcohol or a mixture of at least one polyalkylene oxide monoamine possibly mixed with at least one of the above-described monohydroxy-terminated polyethers, polyesters and/or polyether/polyester bock copolymers and at least one N,N-disubstituted diamine is added and these are preferably converted at temperatures from 20° C. to 200° C., particularly preferred 30° C. to 170° C., until preferably at least 70% of the anhydride structures of the respective base copolymerisate or base copolymer with block copolymer structure are converted. In this case, the primary amino groups react with the anhydride structures of these copolymers to form amides and/or imides, wherein amide formation is encouraged at low reaction temperatures and imide formation is encouraged at increasing reaction temperature. Therefore, at reaction temperatures of 20° C. to 50° C. amide linkages are almost exclusively formed, whereas imide formation is favoured at temperatures over 140° C. Since water is released in the case of imide formation, further anhydride structures of the base (block) copolymerisates can be converted to carboxylic acid functions. In the case of each of these conversions the initially added solvent can be distilled off again to also remove the water produced by the imide formation, if necessary, by azeotropic distillation.

The use of a solvent for the base (block) copolymerisate during the conversion along with the amino components and optionally present monohydroxy-terminated components ensures that all anhydride groups of the base (block) copolymerisates can react in a substantially equivalent manner from the beginning of the conversion. A more homogeneous product is obtained as a result of this.

The molar ratio of the polyalkylene oxide monoamine component and the optionally present monohydroxy-terminated polyether, polyester/polyether block copolymer and/or polyester component to the amino alcohol component or to the N,N-disubstituted diamine component preferably lies in the range of 25:75 to 75:25.

The OH functions of the comb copolymers firstly obtained in the case of conversion with an amino alcohol are partially or completely converted to phosphoric acid ester groups in a further conversion. $P_2O_5$, polyphosphoric acid or phosphoryl chloride, for example, can be used for this. The degree of conversion of the alcohol function should amount to at least 25%, preferably at least 50%.

If N,N-disubstituted diamines are used as amine components in the production of the comb copolymers according to the invention or the comb copolymer mixtures are also used, then the tertiary amino functions are converted partially or completely to quaternary ammonium salts in a subsequent alkylation reaction. The usual alkylation agents such as e.g. benzyl chloride, methyl iodide or a combination of oxirans such as tert-butylphenyl glycidyl ether or styrene oxide can be used with non-ethylene unsaturated carboxylic acids for alkylation. The degree of conversion of the tertiary amino functions to quaternary ammonium salts should amount to at least 25%, preferably at least 50%, wherein carboxylic acid residues that are not ethylene unsaturated, sulphate residues or halides such as chlorides, bromides, iodides can preferably be present as counter-ions.

According to the invention, a comb copolymer or a comb block copolymer or a comb (co)polymer with block copolymer structure is understood to mean a polymer, of which the copolymer or block (co)polymer or copolymer with AB block structure is connected as base polymer to linear polymer side chains via ester, amide and/or imide linkages.

The comb copolymers according to the invention or the comb copolymer mixtures are suitable as wetting and dispersing agents for all purposes of use known from the prior art. Thus, these can be used e.g. for producing or processing paints, printing inks, inks for inkjet processes such as for inkjet printers, coating, leather and textile dyes, pastes, pigment concentrates, ceramics, cosmetic preparations, and preferably always when solids such as pigments and/or fillers are present. The comb copolymers according to the invention or the comb copolymer mixtures can also be used for producing or processing casting and/or moulding compounds based on synthetic, semisynthetic or natural polymers such as, for example, polyvinyl chlorides, saturated or unsaturated polyesters, polyurethanes, polystyrenes, polyacrylates, polyamides, epoxy resins, polyolefins such as polyethylenes or polypropylenes. For example, the comb copolymers according to the invention can be used for the production of casting compounds, PVC plastisols, gel coats, concrete polymer, printed circuit boards, industrial paints, wood and furniture varnishes, vehicle paints, marine paints, anti-corrosion paints, can and coil coatings, artist and house paints, wherein possibly usual auxiliary substances such as binders and/or solvents, pigments and optionally fillers, are added to the comb copolymers according to the invention or mixture thereof with comb block (co)polymers.

Examples of usual binders are resins based on polyurethanes, cellulose nitrates, cellulose acetobutyrates, alkyd, melamine, polyesters, chlorinated rubber, epoxide and acrylate.

The comb copolymers according to the invention or the comb copolymer mixtures according to the invention are also suitable as wetting and dispersing agents for the production of water-based coatings such as cathodic or anodic electrocoatings, e.g. for automotive bodywork. Further examples of use as dispersing agents are plasters, silicate paints, dispersion paints, water paints based on water-dilutable alkyds, alkyd emulsions, hybrid systems, 2-component systems, polyurethane and acrylate dispersions.

The comb copolymers or the comb copolymer mixtures according to the invention of the fourth, fifth and/or sixth combination of structural units are also suitable in particular for the production of solid concentrates, preferably of pigment concentrates. For this, these are present in a support medium such as organic solvents, softeners and/or water and are added to dispersing solids while stirred. In addition, these concentrates can contain binders and/or other auxiliary substances. However, it is also advantageously possible to produce stable binder-free pigment concentrates with the comb copolymers according to the invention and the comb copolymer mixtures according to the invention. It is equally possible to produce flowable pigment concentrates from pigment press cake with the comb copolymers according to the invention or the comb copolymer mixtures according to the invention. In this case, a comb copolymer according to the invention or the above-indicated mixture thereof is added to the press cake, which can still contain water, and the mixture thus obtained is dispersed. Such solid concentrates, preferably pigment concentrates, can then be worked into different substrates such as e.g. alkyd resins, polyester resins, acrylate resins, polyurethane resins or epoxy resins. Pigments that are directly dispersed solvent-free in the comb copolymers according to the invention or the above-indicated comb copolymer mixtures are particularly suitable for pigmenting thermoplastic and thermosetting plastic formulations.

The comb copolymer mixtures according to the invention or the above-indicated comb copolymer mixtures according to the invention can also be advantageously used in the production of inks for "non-impact" printing processes such as thermal inkjet and bubble-jet processes. These inks can be, for example, aqueous ink formulations, solvent-based ink formulations, solvent-free or low-solvent inks for UV applications and also wax-type inks.

Because of their advantageous dispersion properties, the comb copolymers according to the invention or the above-indicated comb copolymer mixtures according to the invention can also be used in the production of colour filters, colour filter paints and these used for the production of liquid-crystal displays, liquid-crystal screens, colour resolution devices, sensors, plasma screens, displays based on SED (surface conduction electron emitter display) or for MLCC (multi-layer ceramic compounds) that are used in the production of microchips and printed circuit boards. In this case, the liquid colour filter paint, also referred to as colour resist, can be applied by a wide variety of application processes such as spin-coating, doctor blade application, a combination of both or by means of "non impact" printing processes such as inkjet processes, for example.

It is important in these fields of use in particular that the wetting and dispersing agents according to the invention are adequately and quickly soluble both in aqueous media and in organic solvents.

The comb copolymers according to the invention or the above-indicated comb copolymer mixtures according to the invention can also be used in the production of cosmetic preparations such as for the production of foundation, powders, lipsticks, hair dyes, creams, nail polishes and sun protection preparations. These can be present in the usual formulations such as in the form of W/O or O/W emulsions, solutions, gels, creams, lotions or sprays. In this case, the comb copolymers according to the invention or the above-indicated comb copolymer mixtures according to the invention can already be used as dispersing agents in the dispersions used for the production of these preparations. These dispersions can have the usual cosmetic support media such as e.g. water, castor oils or silicone oils and solids such as e.g. organic and inorganic pigments such as titanium dioxide or iron oxide.

In addition, the invention also relates to the use of the comb copolymers according to the invention or the above-indicated comb copolymer mixtures according to the invention as wetting and dispersing agents. These wetting and dispersing agents are preferably used for the above-described purposes of use.

A further purpose of use is also the production of a pigmented coating on a substrate, wherein the pigment paint is applied to the substrate and the applied pigment paint is burnt in or cured or cross-linked.

For the purposes of use of the comb copolymers according to the invention or the above-indicated comb copolymer mixtures, these can optionally be used with usual binder agents according to the prior art. When polyolefins are used, it can be advantageous, for example, to use corresponding low-molecular polyolefins as support materials together with at least one comb copolymer according to the invention or a comb copolymer mixture.

A use according to the invention also lies, amongst other things, in the production of dispersible solids in powder particle and/or fibre particle form, in particular in the production of dispersible pigments or plastic fillers, wherein the particles can be coated with a comb copolymer according to the invention. Such coatings of organic or inorganic solids are configured in a known way such as e.g. in EP-A-0 270 126. In this case, the solvent or emulsifier can either be removed or remain in mixture to form a paste. Such pastes are current commercial products that can possibly contain binders as well as further auxiliary substances and additives.

Especially in the case of pigments, the modification, i.e. coating, of the pigment surface can occur by adding the comb copolymers according to the invention or the above-described comb copolymer mixtures during or after the synthesis of the pigments, i.e. by adding them to the pigment suspension or during or after the pigment finish.

Pigments pretreated in this way are distinguished by their ability to be more readily worked in and by a higher colour intensity compared to pigments that have not been surface-treated.

The comb copolymers according to the invention or the above-described comb copolymer mixtures are suitable as wetting and dispersing agents for a plurality of pigments such as mono-, di-, tri- and polyazo pigments, oxazine, dioxazine, thiazine pigments, diketo-pyrrolo pyrroles, phthalocyanines, ultramarine and other metal complex pigments, indigoid pigments, diphenylmethane, triarylmethane, xanthene, acridine, quinacridone, methine pigments, anthraquinone, pyranthrone, perylene and other polycyclic carbonyl pigments. Further examples of the dispersible organic pigments according to the invention are to be found in the monograph: W. Herbst, K. Hunger "Industrial Organic Pigments", 1997 (publisher: Wiley-VCH, ISBN: 3-527-28836-8). Examples of dispersible inorganic pigments according to the invention are pigments based on carbon black, graphite, zinc, titanium dioxide, zinc oxide, zinc sulphide, zinc phosphate, barium sulphate, lithopone, iron oxide, ultramarine, manganese phosphate, cobalt aluminate, cobalt stannate, cobalt zincate, antimony oxide, antimony sulphide, chromium oxide, zinc chromate, mixed metal oxides based on nickel, bismuth, vanadium, molybdenum, cadmium, titanium, zinc, manganese, cobalt, iron, chromium, antimony, magnesium, aluminium (e.g. nickel-titanium yellow, bismuth-vanadate molybdate yellow or chromium titanium yellow). Further examples are specified in the monograph: G. Buxbaum "Industrial Inorganic Pigments", 1998 (publisher: Wiley-VCH, ISBN: 3-527-28878-3). Inorganic pigments can also be magnetic pigments based on pure iron, iron oxides and chromium oxides or mixed oxides, metallic effect pigments composed of aluminium, zinc, copper or brass as well as pearlescent pigments, fluorescent and phosphorescent luminescent pigments. Nanoscale, organic or inorganic solids with particle sizes below 100 nm such as certain carbon black types or particles, which are composed of a metal or semimetal oxide or hydroxide, as well as particles composed of mixed metal and/or semimetal oxides or hydroxides can also be dispersed by means of the comb copolymers according to the invention or the above-indicated comb copolymer mixtures. Suitable oxides for this are oxides and/or oxide hydroxides of aluminium, silicon, zinc, titanium that can be used for the production of such extremely fine-particle solids. The production of these oxide or hydroxide or oxide-hydroxide particles can be performed using various processes e.g. ion-exchange processes, plasma processes, sol-gel processes, precipitation, crushing (e.g. by milling) or flame hydrolysis etc. These nanoscale solids can also be so-called hybrid particles, which are formed from an inorganic core and an organic shell or vice versa.

According to the invention, dispersible, powder or fibrous fillers are, inter alia, those that are formed from powder or fibrous particles of aluminium oxide, aluminium hydroxide, silicon dioxide, diatomaceous earth, silica, quartz, silica gel, talc, kaolin, mica, perlite, feldspar, slate flour, calcium sulphate, barium sulphate, calcium carbonate, calcite, dolomite, glass or carbon. Further examples of dispersible pigments or fillers are also to be found in EP-A-0 270 126. Flame retardants such as e.g. aluminium or magnesium hydroxide and flatting agents such as e.g. silicic acids can also be excellently dispersed and stabilised with the comb copolymers according to the invention or the above-indicated comb copolymer mixtures.

Therefore, the present invention additionally relates to paints, pastes and moulding compounds containing at least one comb copolymer according to the invention or at least one comb copolymer mixture according to the invention and at least one pigment, an organic substrate and/or water, and also binders and usual auxiliary substances, if necessary.

Therefore, the present invention additionally relates to the abovementioned pigments coated with at least one comb copolymer according to the invention or with at least one above-indicated comb copolymer mixture according to the invention.

The comb copolymers according to the invention or the above-indicated comb copolymer mixtures according to the invention can also be used, if necessary, in mixture with further known wetting and dispersing agents in order to meet special requirements. For this, they can be used together with wetting and dispersing agents that are disclosed, for example, in U.S. Pat. No. 6,849,679, U.S. Pat. No. 4,656,226, U.S. Pat. No. 4,755,563, U.S. Pat. No. 5,085,698, U.S. Pat. No. 5,160,372, U.S. Pat. No. 5,219,945, U.S. Pat. No. 5,221,334, U.S. Pat. No. 5,272,201, U.S. Pat. No. 5,519,085, U.S. Pat. No. 5,859,113, U.S. Pat. No. 6,306,994, U.S. Pat. No. 6,316,564, U.S. Pat. No. 6,413,306, WO 01/44389, WO 03/046029, EP 0 438 836, 1 416 019, DE 35 27 038 and DE 36 41 581, by mixing them with these wetting and dispersing agents before or during the cold transfer of the pigments or solids. The corresponding disclosure in these publications is incorporated herewith as part of the disclosure of the present application.

EXAMPLES

Production of SMA Copolymers with Side Chains

Polymer 1

65 g of SMA 2000 synthetic resin (with 187 mmol of anhydride groups) are dissolved in 65 g of methoxypropyl acetate and slowly mixed with a mixture of 94 mmol of Jeffamin M2070 and 94 mmol of N,N-dimethylaminopropylamine. The mixture is caused to react at 170° C. for 4 h. The methoxypropyl acetate is distilled off during this.

Polymer 2

60 g of SMA 1000 synthetic resin (with 254 mmol of anhydride groups) are dissolved in 90 g of methoxypropyl acetate and slowly mixed with a mixture of 127 mmol of Jeffamin M2070 and 127 mmol of N,N-dimethylaminopropylamine. The mixture is caused to react at 170° C. for 4 h. The methoxypropyl acetate is distilled off during this.

Polymer 3

65 g of SMA 2000 synthetic resin (with 187 mmol anhydride groups) are dissolved in 65 g of methoxypropyl acetate and slowly mixed with 94 mmol of Jeffamin M2070. The mixture is caused to react at 170° C. for 4 h. The methoxypropyl acetate is distilled off during this. Then, 94 mmol of N,N-dimethylaminopropylamine are added and stirred for a further 4 h at 50° C.

Polymer 4

65 g of SMA 2000 synthetic resin (with 187 mmol of anhydride groups) are dissolved in 65 g of methoxypropyl acetate and slowly mixed with 94 mmol of Jeffamin M2070. The mixture is caused to react at 170° C. for 4 h. The methoxypropyl acetate is distilled off during this.

Polymer 5

65 g of SMA 2000 synthetic resin (with 187 mmol of anhydride groups) are dissolved in 65 g of methoxypropyl acetate and slowly mixed with a mixture of 94 mmol of Jeffamin M2070 and 94 mmol of 2-amino ethanol. The mixture is caused to react at 170° C. for 4 h. The methoxypropyl acetate is distilled off during this.

Wetting and Dispersing Agent 1 (Comparative Example with Amine Adhesion Group)

Polymer 1 is dissolved to 40% by wt. in 30% methoxypropyl acetate and 30% by wt. of butyl glycol.

Wetting and Dispersing Agent 2 (Comparative Example in Association with U.S. Pat. No. 6,528,593)

80 g of polymer 1 are dissolved in 60 g of methoxypropyl acetate and 60 g of butyl glycol and caused to react with 3 g of 50% by wt. aqueous hydrogen peroxide solution for 8 h at room temperature and then heated to 100° C. for 2 h to destroy the excess peroxide.

Wetting and Dispersing Agent 3 (Comparative Example in Association with U.S. Pat. No. 7,078,464)

80 g of polymer 1 are dissolved in 62 g of methoxypropyl acetate and 62 g of butyl glycol and converted with 2.6 g of methacrylic acid to the corresponding salt.

Wetting and Dispersing Agent 4

80 g of polymer 1 are dissolved in 62.85 g of methoxypropyl acetate and 62.85 g of butyl glycol and caused to react with 3.8 g of benzyl chloride for 8 h.

Wetting and Dispersing Agent 5

80 g of polymer 2 are dissolved in 63 g of methoxypropyl acetate and 63 g of butyl glycol and caused to react with 4.1 g of benzyl chloride for 8 h.

Wetting and Dispersing Agent 6

80 g of polymer 2 are dissolved in 62.85 g of methoxypropyl acetate and 62.85 g of butyl glycol and caused to react with 3.8 g of benzyl chloride for 8 h.

Wetting and Dispersing Agent 7 (Comparative Example)

Example 12 from the German Offenlegungsschrift DE 35 27 038.

Wetting and Dispersing Agent 8 (Comparative Example)

80 g of polymer 4 are dissolved in 80 g of butyl glycol.

Wetting and Dispersing Agent 9 (Comparative Example)

80 g of polymer 5 are dissolved in 80 g of butyl glycol.

Wetting and Dispersing Agent 10

80 g of polymer 5 are dissolved in 100 g of butyl acetate and converted with 2.7 g of polyphosphoric acid over 3 h at 80° C. The butyl acetate is then removed by distillation and the resulting polymer is dissolved to 50% by wt. in butyl glycol.

| | |
|---|---|
| SMA 2000 synthetic resin | styrene-maleic anhydride copolymer, manufacturer Cray Valley |
| Jeffamin M 2070 | amine-terminated EO/PO polyether, manufacturer Huntsman |

Applications Testing

Solubility Tests

All wetting and dispersing agents 1 to 10 are respectively to 5% by wt. homogeneously soluble in water, methoxypropyl acetate, butyl acetate, butyl glycol or methoxypropanol.

Paints Containing Solvents

| Ground material: | % by wt. |
|---|---|
| Resin | 14.3% |
| n-butanol | 5% |

-continued

| Ground material: | % by wt. |
|---|---|
| Wetting and dispersing agent | 5% (in relation to solids) |
| Pigment | 15% |
| was topped to | 100% |
| with PMA (methoxypropyl acetate) | |

Resin: benzyl methacrylate/methacrylic acid copolymer, 35% in methoxypropyl acetate, acid number 53, manufacturer Byk-Chemie
Pigment: Irgaphor Red BT-CF DPP Pigment PR 254, manufacturer Ciba Speciality Chemicals
PMA: methoxypropyl acetate Dispersion: Paintshaker DAS 200 (1.4 to 1.7 mm Zirconox pellets) for 3 h at 30° C.

Dissolution Test:

The paint is applied to a glass plate by means of a spin-coater, so that a layer thickness of 1200 nm±200 nm is obtained. The dried glass plates are then kept in a developer solution or methoxypropyl acetate.

Developer:

The liquid is moved through a magnetic stirrer. The time until the paint film has completely dissolved from the glass plate is measured.

Methoxypropyl Acetate:

The glass plate is immersed in methoxypropyl acetate for 10 min and then the liquid is moved through a magnetic stirrer. The time until the paint film has completely dissolved from the glass plate is measured.

Evaluation of the paint with

| Wetting and dispersing agent | Viscosity at 100 1/s** | Solubility in the developer | Dissolving Behaviour | Solubility in PMA | Dissolving Behaviour |
|---|---|---|---|---|---|
| 1 | 40 mPa * s | 20 sec | dissolved | 130 sec | flakes |
| 2 | 25 mPa * s | 12 sec | dissolved | 117 sec | dissolved |
| 3 | 37 mPa * s | 7 sec | dissolved | not soluble | — |
| 7 | 19 mPa * s | 70 sec | flakes | 120 sec | flakes |
| 4 | 12 mPa * s | 15 sec | dissolved | 179 sec | dissolved |
| 5 | 18 mPa * s | 43 sec | dissolved | 140 sec | dissolved |
| 6 | 19 mPa * s | 3 sec | dissolved | 190 sec | dissolved |

**The viscosity determination was conducted using the Stresstech device from Reologica Instruments AB, Lund, Sweden Measurement parameters:

CSR measurement (given shear rate), conical plate geometry (cone: 4 cm, 1°),

Measurement range: $0.1\text{-}1000\ s^{-1}$,

Measurement conditions: measurement up and down, no initial shear, levelling time: 10 s Wetting and dispersing agents of comparative example 7 are currently used as wetting and dispersing agents in colour resists. They result in a relatively long resolution time of the colour resist in the developer and lead to incomplete dissolution of the paint in the developer.

When using a wetting and dispersion agent according to comparative examples 1-3, the required very low viscosities for the colour resist are not reached. By using wetting and dispersion agents with adhesion groups according to Examples 4-6 of the invention, the viscosity can be further reduced to the required extent.

Aqueous Pigment Concentrates

| | % by wt. |
|---|---|
| Water | 26.5% |
| Wetting and dispersing agent | 12% |
| Pigment (Bayferrox 130 M) | 60% |
| BYK-024 defoaming medium | 1% |
| BYK-420 rheology additive | 0.5% |
| | 100% |

Pigment: Bayferrox 130M (iron oxide pigment, manufacturer Lanxess)
BYK-024: defoaming medium, manufacturer: Byk Chemie
BYK-420: rheology additive, manufacterer: Byk Chemie Dispersion: Dispermat CV, 8000 rpm, 40 min dispersion time at 40° C.

Visual Evaluation of the Viscosity of the Pigment Concentrates:

| Wetting and dispersing agent I | 8 | 9 | 10 |
|---|---|---|---|
| Viscosity | 4 | 5 | 2 |

The evaluation of the viscosity was conducted in accordance with school marks, i.e.
1=very good (very low viscosity)
to
5=unsatisfactory (highly viscous)

The pigment concentrates with the pigment Bayferrox 130M and wetting and dispersing agent 8 or 9, which do not contain any ionic adhesion groups, exhibit a high viscosity. Use of wetting and dispersing agent 10 according to the invention, however, demonstrates a clearly lower viscosity of the pigment concentrate.

The invention claimed is:

1. A comb copolymer formed of an optionally substituted styrene/maleic anhydride copolymerisate containing the combinations of the following structural units I to X indicated below:
wherein

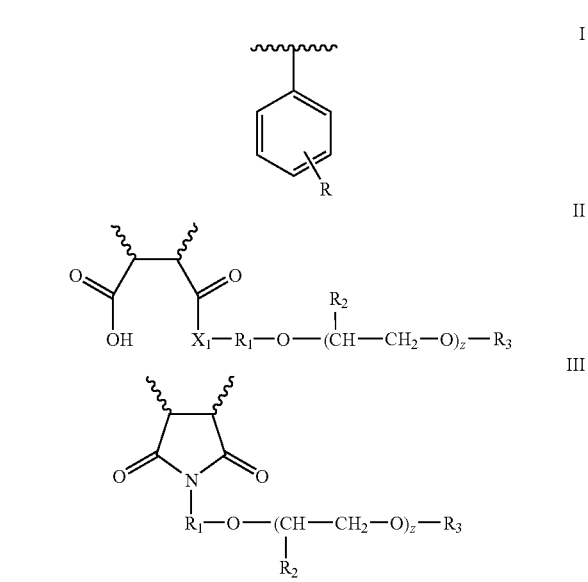

IV
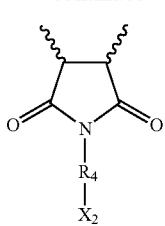

V
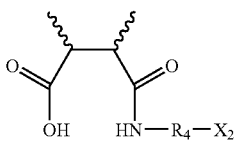

VI
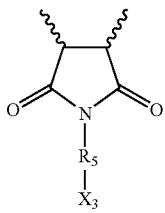

VII
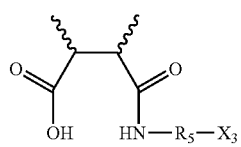

VIII
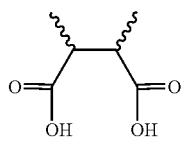

IX
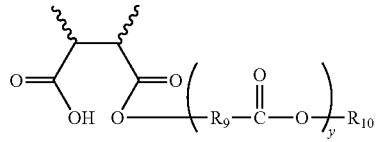

X
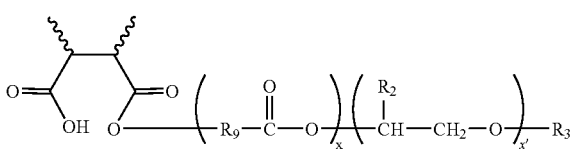

⁓⁓⁓ stands for the chain linkage,

R stands for H, halogen, a nitro group, an alkyl group with 1 to 15 C atoms or an aryl group with 6 to 18 C atoms, $R_1$ stands for an alkylene group with 1 to 24 C atoms or a substituted or unsubstituted arylene group with 6 to 18 C atoms, $R_2$ stands for H or an alkyl group, wherein 0 to 95% of $R_2$ represent an alkyl group, z stands for a whole number from 3 to 70, $X_1$ stands for NH and/or O, $R_3$ stands for an optionally substituted, mono- or polyunsaturated alkyl group with 1 to 30 C atoms, an optionally substituted aryl group with 6 to 18 C atoms, or an optionally substituted cycloalkyl group with 4 to 10 C atoms, $R_4$ and $R_5$ are the same or different and each stands for an optionally substituted alkylene group with 1 to 15 C atoms, an optionally substituted cycloalkylene group with 4 to 10 C atoms or a substituted or unsubstituted arylene group with 6 to 18 C atoms, $X_2$ stands for a phosphoric acid ester group or a hydroxyl group, wherein at least 25% of $X_2$ stand for phosphoric acid ester groups, $X_3$ stands for an N,N-disubstituted amino group of the formula A, A
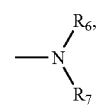

or a quaternary ammonium group of the formula B,

B
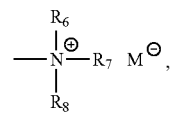

wherein $M^e$ stands for a carboxylic acid residue that is not ethylene unsaturated, a sulphate residue or a halide, $R_6$, $R_7$, $R_8$ are the same or different and each stands for an alkyl group with 1 to 15 C atoms, a cycloalkyl group with 6 to 10 C atoms or a substituted or unsubstituted aryl group with 6 to 18 C atoms, wherein at least 25% of $X_3$ stand for an N,N-disubstituted amino group of the formula B, and $R_9$ stands for an optionally substituted alkylene residue with 2 to 15 C atoms, an optionally substituted cycloalkylene residue with 6 to 10 C atoms and/or for an optionally substituted arylene residue with 6 to 18 C atoms, $R_{10}$ stands for an optionally substituted alkyl residue with 1 to 30 C atoms, which is optionally mono- or polyunsaturated, and/or an optionally substituted aryl residue, x stands for a whole number from 1 to 70 x' stands for a whole number from 3 to 70 y stands for a whole number from 1 to 70, wherein the comb copolymer has either a 1. combination of structural units I to V and VIII, wherein $X_1$ in structural unit II only stands for an NH group, a
2. combination of structural units I to III and VI to VIII, or a
3. combination of structural units I to III and VI to VIII and structural unit IX and/or X, and is optionally present in mixture with at least one further comb copolymer of an AB block copolymer structure comprising an A block, which is formed from optionally substituted styrene and maleic anhydride, and at least one B block, which is formed from optionally substituted styrene and/or (meth)acrylate monomers, and its maleic anhydride groups are present to at least 70% as structural units in one of the following combinations: a
4. combination of structural units II to V and VIII, wherein $X_1$ in structural unit II only stands for an NH group, a
5. combination of structural units II to III and VI to VIII or a
6. combination of structural units II to III and VI to VIII and structural unit IX and/or X.

2. A Comb copolymer or mixture thereof with at least one further comb copolymer according to claim 1, wherein
R is H
$R_1$ is an alkylene group with 1 to 6 C atoms,
$R_2$ is H or $CH_3$,
wherein the molar ratio of ethylene oxide units to propylene oxide units in structural unit II and structural unit III is in the range of 30:70 to 70:30,
$X_2$ to at least 50% is a phosphoric acid ester group,
$R_3$ is an alkyl group with 1 to 8 C atoms or an optionally substituted aryl group with 6 C atoms,
$R_4$ is an alkylene group with 1 to 8 C atoms,
$R_5$ is an alkylene group with 1 to 8 C atoms,
$X_3$ is present to 100% as a residue of the general formula B,
$R_6$, $R_7$, $R_8$ are the same or different, and each is an optionally substituted alkyl group with 1 to 8 C atoms,
$R_9$ is an optionally substituted alkylene group with 3 to 8 C atoms,
$R_{10}$ is an alkyl residue with 4 to 20 C atoms,
z is a whole number from 5 to 60,
y is a whole number from 2 to 60,
x is a whole number from 2 to 60,
x' is a whole number from 5 to 60,
wherein the molar ratio of structural units II, III and IX and/or X to structural units VI and VII is 25:75 to 75:25.

3. A comb copolymer or mixture thereof with at least one further comb copolymer according to claim 1 wherein the molar ratio of structural unit I to the entire unit of the other structural units of the comb copolymer present in the 1. to the 3. combinations or to all the other structural units of the further comb copolymer present in the 4. to 6. combinations amounts to 1:1 to 8:1.

4. A comb copolymer or mixture thereof with at least one further comb copolymer according to claim 1, wherein in structural units I to X
R=H,
$R_1$ is an ethylene, propylene and/or isopropylene residue,
$R_2$ is H or a $CH_3$ residue,
wherein the molar ratio of ethylene oxide units to propylene oxide units is 70:30 to 30:70,
$R_3$ is a $CH_3$ or $C_4H_9$ residue,
z is a whole number from 25 to 50,
$X_1$ is NH and/or O,
$R_4$, $R_5$ the same or different, are an alkyl residue with 2-4 C atoms,
$R_6$, $R_7$, $R_8$, the same or different, are a $CH_3$, $C_2H_5$ or benzyl residue, with $M^e$ chloride or bromide
$R_9$ is an alkylene residue with 4 and/or 5 C atoms,
$R_{10}$ is an alkyl residue with 4-14 C atoms,
x is a whole number from 4 to 30,
x' is a whole number from 25 to 50 and
y is a whole number from 4 to 30.

5. A comb copolymer or mixture thereof with at least one further comb copolymer obtained
a) by conversion of at least one optionally substituted styrene/maleic anhydride group copolymerisate (SMA resin) optionally in mixture with at least one further copolymer of an AB block copolymer structure consisting of at least one A block, which is formed from optionally substituted styrene and maleic anhydride, and a B block, which is formed from optionally substituted styrene and/or (meth)acrylate monomers, with
  a1) a mixture of at least one polyalkylene oxide monoamine having a primary amino end group and at least one amino alcohol
  or
  a2) a mixture of at least one polyalkylene oxide monoamine having a primary amino group and at least one N,N-disubstituted diamine
  or
  a3) a mixture comprising a2) and at least one polymer selected from the group consisting of monohydroxy-terminated polyalkylene oxides, monohydroxy-terminated polyesters and monohydroxy-terminated polyester-polyalkylene oxide block copolymers,
and
b) a subsequent at least partial conversion
  b1) of the free hydroxyl groups of the comb copolymer obtained according to a1) or the comb copolymer mixture to phosphoric acid ester groups
  or
  b2) of the free N,N-disubstituted amino groups of the comb copolymer obtained according to a2) or a3) or the comb copolymer mixtures with at least one alkylation compound to quaternary ammonium groups.

6. A comb copolymer or mixture thereof with at least one further comb copolymer according to claim 5, wherein respectively before the conversion according to a), the SMA resin or mixture thereof with at least one further copolymer based on an AB block copolymer structure is present dissolved in an organic solvent.

7. A comb copolymer or mixture thereof with at least one further comb copolymer according to claim 5 wherein the conversion according to a) is conducted at a temperature of 20° C. to 200° C.

8. A comb copolymer or mixture thereof with at least one further comb copolymer according to claim 5, wherein during the conversion according to a1), a2) or a3), the molar ratio of the polyalkylene oxide monoamine component to the amino alcohol or N,N-disubstituted diamine component or polyalkylene oxide monoamine component and of the monohydroxy-terminated polyalkylene oxide, polyester and/or polyester polyalkylene oxide block copolymer component to the N,N-disubstituted diamine component lies is in the range of 25:75 to 75:25.

9. A comb copolymer or mixture thereof with at least one further comb copolymer according to claim 5, wherein the degree of conversion in the conversion according to b1) or b2) amounts to at least 25%.

10. A wetting and dispersing agent optionally in mixture with at least one further wetting and dispersing agent, comprising at least one comb copolymer of claim 1.

11. A method for processing pigments, fillers or a combination thereof, which comprises processing said pigments, fillers or combination thereof in the presence of a wetting and dispersing agent of claim 10.

12. A method for producing and/or processing pigment concentrates or pastes, which comprises producing or processing said pigment concentrates or pastes in the presence of a wetting and dispersing agent of claim 10.

13. The method of claim 12, wherein said pigment concentrates or pastes are paints, printing inks, inks for inkjet processes, coating, leather and/or textile dyes, ceramics or cosmetic preparations.

14. The method of claim 12, wherein said pigment concentrates or pastes are casting compounds, moulding compounds or a combination thereof formed of synthetic, semisynthetic or natural polymers.

15. The method of claim 12, wherein said pigment concentrates or pastes are colour filter paints.

16. A method for the production of colour filters for liquid-crystal displays, liquid-crystal screens, colour resolution devices, sensors, plasma screens, displays based on SED or for MLCC which comprises applying the color filter paint of claim 15 to said liquid-crystal displays, liquid-crystal screens, colour resolution devices, sensors, plasma screens or displays based on SED or MLCC.

17. Wetting and dispersing agent of claim 10, further comprising a binder.

18. Paints, pastes or moulding compounds containing at least one comb copolymer or mixture thereof with at least one further comb copolymer according to claim 1 as wetting and dispersing agent, at least one pigment, optionally an organic or aqueous medium, optionally at least one binder and at least one further wetting and dispersing agent.

19. A pigment, the surface of which is modified with at least one comb copolymer or mixture thereof with at least one further comb copolymer according to claim 1.

20. The comb copolymer of claim 3, wherein said molar ratio of structural unit I to the entire unit of the other structural units of the comb copolymer present in the 1. to the 3. combinations or to all the other structural units of the further comb copolymer present in the 4. to 6. combinations amounts to 1:1 to 2:1.

21. The comb copolymer or mixture thereof of claim 7, wherein said temperature at which said conversion is conducted is 30° C. to 170° C.

22. The comb copolymer or mixture thereof of claim 8, wherein the molar ratio of the polyalkylene oxide monoamine component to the amino alcohol or N,N-disubstituted diamine component or polyalkylene oxide monoamine component and of the monohydroxy-terminated polyalkylene oxide, polyester and/or polyester polyalkylene oxide block copolymer component to the N,N-disubstituted diamine component is in the range of from 40:60 to 60:40.

23. The comb copolymer or mixture thereof of claim 9, wherein said degree of conversion in the conversion according to b1) or b2) amounts to at least 50%.

* * * * *